US010965995B2

(12) United States Patent
McRae

(10) Patent No.: US 10,965,995 B2
(45) Date of Patent: Mar. 30, 2021

(54) SYSTEM, METHOD, AND APPARATUS FOR SENSING USERS FOR DEVICE SETTINGS

(71) Applicant: J. Whitaker McRae, Tampa, FL (US)

(72) Inventor: J. Whitaker McRae, Tampa, FL (US)

( * ) Notice: Subject to any disclaimer, the term of this patent is extended or adjusted under 35 U.S.C. 154(b) by 123 days.

(21) Appl. No.: 16/029,910

(22) Filed: Jul. 9, 2018

(65) Prior Publication Data

US 2020/0014983 A1  Jan. 9, 2020

(51) Int. Cl.
*H04N 21/485* (2011.01)
*G01S 13/04* (2006.01)
*H04N 21/466* (2011.01)
*H04N 21/45* (2011.01)
*G01S 13/06* (2006.01)

(52) U.S. Cl.
CPC .......... *H04N 21/485* (2013.01); *G01S 13/04* (2013.01); *G01S 13/06* (2013.01); *H04N 21/4532* (2013.01); *H04N 21/4661* (2013.01); *G05B 2219/2615* (2013.01)

(58) Field of Classification Search
CPC ............. H04N 21/485; H04N 21/4532; H04N 21/4661; G01S 13/04; G01S 13/06; G01S 13/4661; G05B 2219/2615

USPC .......................................................... 700/22
See application file for complete search history.

(56) References Cited

U.S. PATENT DOCUMENTS

| 6,530,083 | B1 | 3/2003 | Liebenow | |
|---|---|---|---|---|
| 2016/0040902 | A1* | 2/2016 | Shah | G01S 5/021 700/277 |
| 2016/0047890 | A1* | 2/2016 | Ryan | H05B 33/0845 398/118 |
| 2016/0366531 | A1* | 12/2016 | Popova | G06F 3/165 |
| 2017/0048337 | A1* | 2/2017 | Fraccaroli | H04L 67/18 |
| 2017/0197549 | A1* | 7/2017 | Vladimerou | B60W 50/14 |
| 2018/0074782 | A1* | 3/2018 | McGibney | H04R 1/406 |

* cited by examiner

*Primary Examiner* — Kenneth M Lo
*Assistant Examiner* — Michael W Choi
(74) *Attorney, Agent, or Firm* — Larson & Larson, P.A.; Frank Liebenow; Justin P. Miller

(57) ABSTRACT

A system determines who is present within an area by reading radio waves emitted from a device carried by the user and then adjusts various devices within or near the area of the user based upon a profile(s) of the user(s) that are in the area. The devices (e.g. speaker systems, lighting systems, televisions, music systems) are controlled based upon profiles of the users, giving more control priority to the users that are closer to the devices.

9 Claims, 11 Drawing Sheets

SYSTEM, METHOD, AND APPARATUS FOR SENSING USERS FOR DEVICE SETTINGS

FIELD

This invention relates to the field of electrical control and more particularly to a system for determining the location of users and adjusting devices based upon the spatial relationship of the users that are local.

BACKGROUND

There are many smart devices and systems on the market. For example, networked lightbulbs allow users to send signals over local area networks to control the light's brightness and hue. Although such devices are called "smart" devices, they are only slaves to individual commands sent over a wireless network.

Add an infrared motion sensor and when a person, any person, walks into a room, the motion sensor detects the person and turns on the lights. Seems smart, but this system doesn't know which person is in the room, where in the room that person is located, and how that person would like to set the lighting. Such systems are useful in, for example, bathrooms where lighting is not desired when no person is present.

The present systems do not recognize the person or people that are present and, therefore, does not understand how to adjust various hardware based upon preferences of each person.

What is needed is a system that will detect one or more people within an area and adjust local devices in that area based upon preferences of each of the people that are detected.

SUMMARY

Nowadays, almost everybody has in their possession some sort of smart device such as a smartphone, a smartwatch, a personal fitness device, etc. The present system determines who is present within an area by reading radio waves emitted from a smart device and then adjusts various devices within or near the area of the smart device based upon a profile or profiles of the person or people that are in the area. For example, in a household of two people, when the first person enters a room, lighting and music are set to the preferences of that person (e.g. low light, new age music) while when the second person enters the same room, lighting and music are set to the preferences of the second person (e.g. medium light, rock music). If both are present in the room, a compromise between preferences is made and the lighting and music are set according to the preference (e.g. medium-low light and music off).

In another example, the area is a dance floor. As a user moves closer to a first speaker and light emitter of the dance floor, the sound and lighting are adjusted to that user's tastes. As that user moves to another position on the dance floor, a second speaker and light emitter that are now near the user are adjusted to that user's tastes. As other users enter the same area, the devices (speakers, light emitters, etc.) are set based upon each of the user's tastes (e.g. profile values) and a distance between each of the users and the devices so that, the users closer to the devices have more impact on the settings of those devices than the users that are farther away from the devices. In some embodiments, alternate weighting or biasing is also provided to give one user priority over another user (e.g. if two users are the same distance from a speaker, the user with the higher priority will influence settings of the speaker more than the user with lower priorities).

In one embodiment, a system for sensing users includes a computer that has software for detecting a location of one or more users within an area (e.g. utilizing signal strengths or triangulation of a radio signal transmitted from a device on the person of the user such as a smartphone, smartwatch, or personal fitness device). There is also software for calculating a setting of a device within the area (e.g. based upon a distance from each user to the device and a profile value of each user for that device). The device is set based upon the setting (e.g. the brightness and/or color output of the device or the audio volume and/or compensation of the device).

In another embodiment, a method for sensing users includes determining a location of users within an area and obtaining a profile for each user within the area. For each user within the area: a distance between each device and each of the users is determined, then a setting for the each device is calculated based upon a profile setting of each user for each device and the distance between each device and each user. Each device is then set to the setting for the device (e.g. brightness/color output of the each device or volume/frequency compensation of the each device).

In another embodiment, method for sensing users includes determining a location of a user within an area and obtaining a profile for the user. The profile has a value related to a device (e.g. a speaker or lighting device within the area). A distance between the device and the user is determined (e.g. by a received signal strength or triangulation of a radio signal received from a device on the person of the user) and then a setting for the device is calculated based upon the value from the profile related to the device multiplied by a reciprocal of the distance between the device and the user (e.g. as the user gets closer to the device, the calculation is biased to that user's profile settings). The device is then set to the setting for the device.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
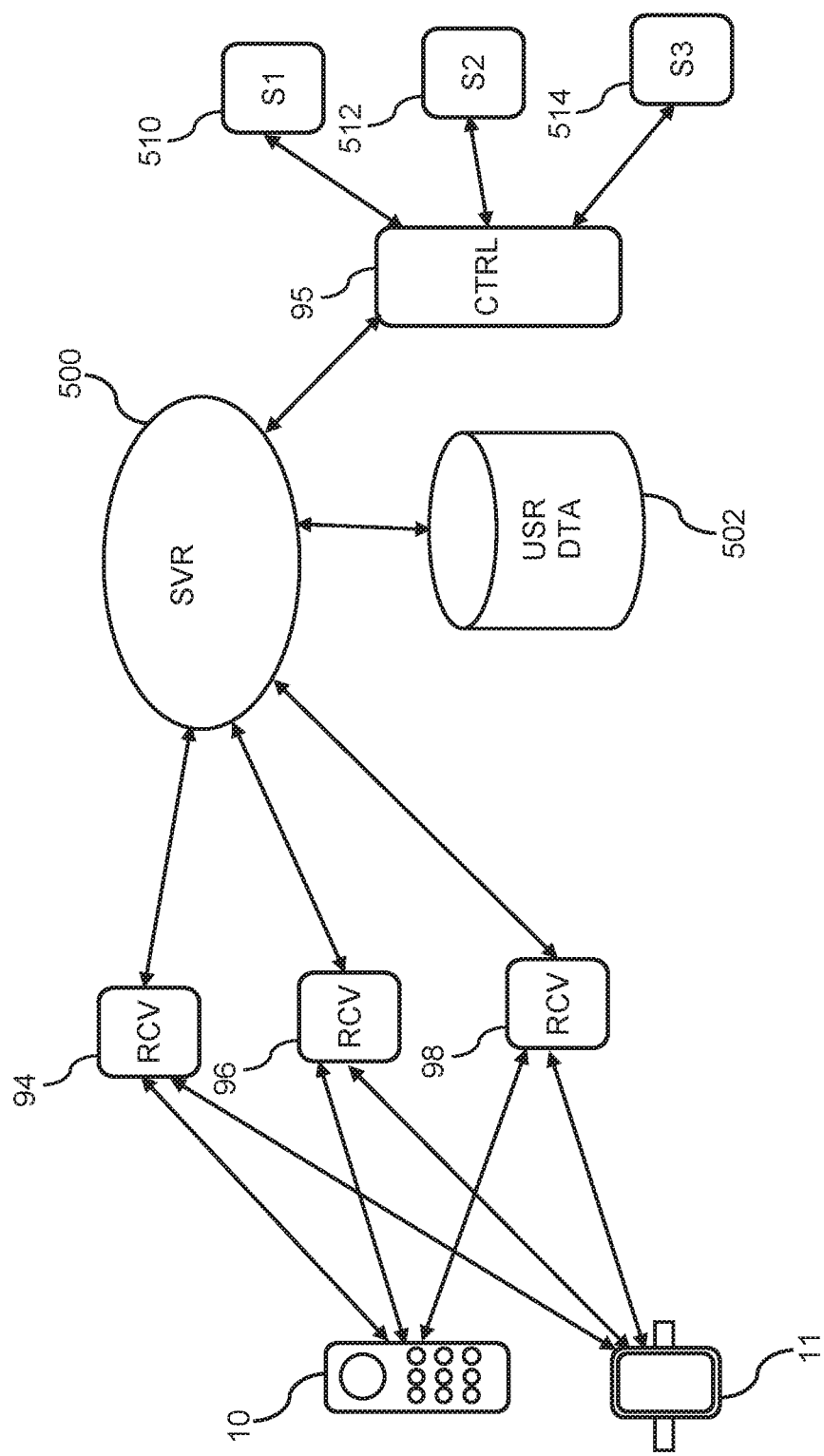
FIG. 1 illustrates a data connection diagram of the system for sensing users.

Reference will now be made in detail to the presently preferred embodiments of the invention, examples of which are illustrated in the accompanying drawings. Throughout the following detailed description, the same reference numerals refer to the same elements in all figures.

Throughout this description, the term, "user" describes a person or other being who moves into and with the area of coverage and is, therefore, sensed by the system for sensing users.

The description uses the term "smart device" is used to describe any device that is typically held on the person (e.g. the users) and emits a radio frequency signal. Throughout this description, a smartphone or smartwatch is used as an example of a smart device.

Referring to FIG. 1 illustrates a data connection diagram of the exemplary system for sensing a user. In this example, one or more smart devices such as smartphones 10 and smartwatches 11 emit radio frequency signals that are received and processed by one or more radio receivers 94/96/98 within or near to the area 100 of coverage (see FIGS. 4 and 5). The radio receivers 94/96/98 are operationally connected to a server computer 500. The server, utilizing signal strength values and/or signal timing values from the radio receivers 94/96/98 determines which users are present in the area 100 and a location of each user within the area 100. In one embodiment, the radio receivers 94/96/98 receive and process a radio frequency signal that has embedded there within a value that uniquely identifies the user. In some embodiments, the radio receivers 94/96/98 transact with the smart devices 10/11 to extract data for identifying the users and/or for determining user preferences.

In some embodiments, the user preferences are received directly from the smart devices 10/11 while in other embodiments, the user preferences are stored in a user data area 502 that is accessible by the server computer 500. In the latter, the value that uniquely identifies the user is used to find the user preferences in the user data area 502.

Having identified the users and located the users, the server controls various devices 510/512/514 through a control circuit 95. For example, the control circuit 95 adjusts sound levels, sound equalization, lighting, etc., based upon which user is in which location, making adjustments when multiple users are near each other.

Figure 2:
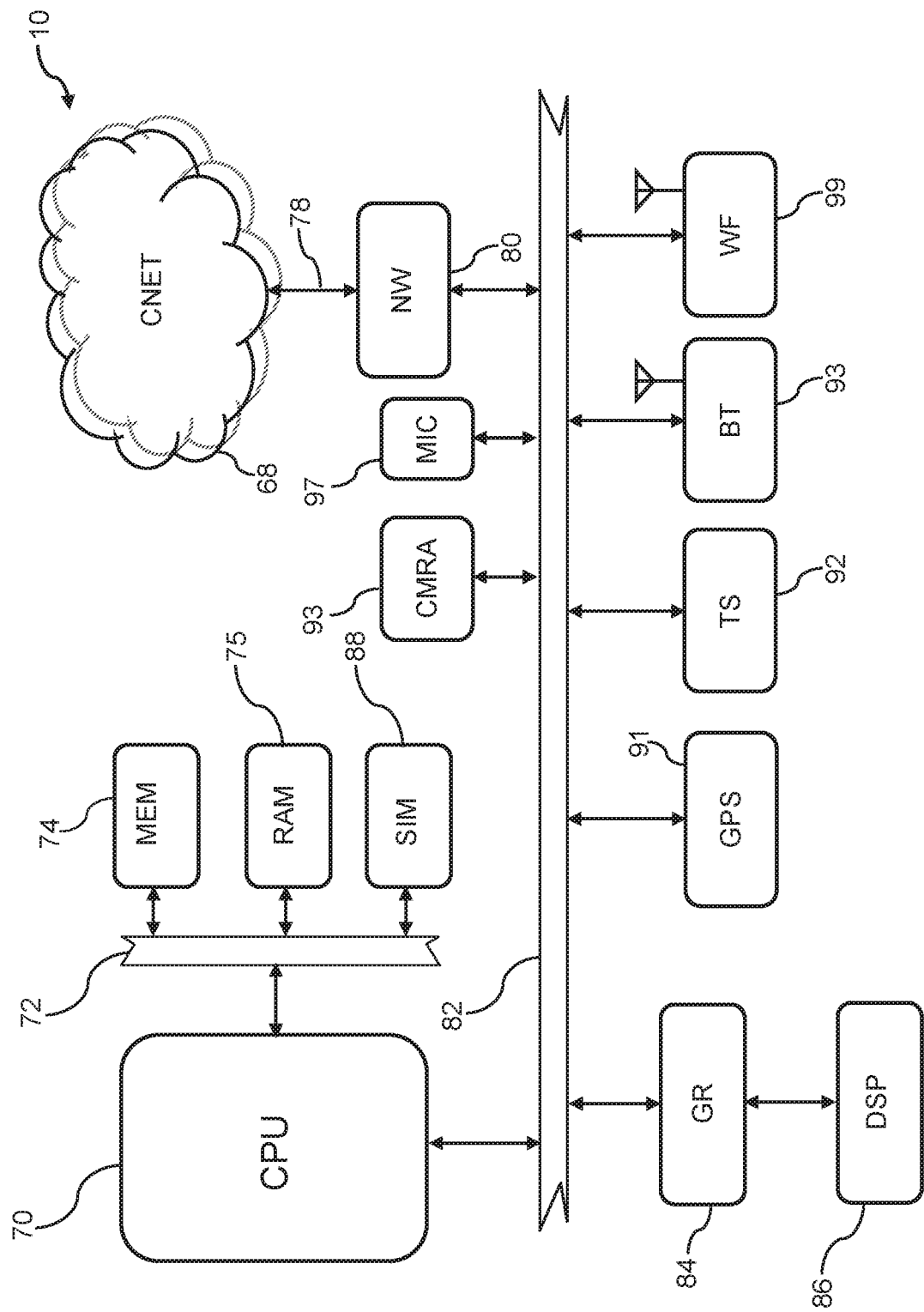
FIG. 2 illustrates a schematic view of a typical smartphone.

Referring to FIG. 2, a schematic view of a typical smart device, a smartphone 10 is shown though other portable (wearable or carried with a person) end-user devices such as tablet computers, smartwatches 11, smart ear buds, smart eyewear, personal fitness devices, etc., are fully anticipated. Although any end-user device is anticipated, for clarity purposes, a smartphone 10 will be used in the remainder of the description.

The example smartphone 10 represents a typical device used for sensing users in the system for sensing a user. This exemplary smartphone 10 is shown in one form with a sample set of features. Different architectures are known that accomplish similar results in a similar fashion and the present invention is not limited in any way to any particular smartphone 10 system architecture or implementation. In this exemplary smartphone 10, a processor 70 executes or runs programs in a random-access memory 75. The programs are generally stored within a persistent memory 74 and loaded into the random-access memory 75 when needed. Also accessible by the processor 70 is a SIM (subscriber information module) card 88 having a subscriber identification and often persistent storage. The processor 70 is any processor, typically a processor designed for phones. The persistent memory 74, random-access memory 75, and SIM card are connected to the processor by, for example, a memory bus 72. The random-access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, flash memory, read only memory, battery-backed memory, etc. In some exemplary smartphones 10, the persistent memory 74 is removable, in the form of a memory card of appropriate format such as SD (secure digital) cards, micro SD cards, compact flash, etc.

Also connected to the processor 70 is a system bus 82 for connecting to peripheral subsystems such as a cellular network interface 80, a graphics adapter 84 and a touch screen interface 92. The graphics adapter 84 receives commands from the processor 70 and controls what is depicted on the display 86. The touch screen interface 92 provides navigation and selection features.

In general, some portion of the persistent memory 74 and/or the SIM card 88 is used to store programs, executable code, and data, etc. In some embodiments, other data is stored in the persistent memory 74 such as audio files, video files, text messages, etc.

The peripherals are examples and other devices are known in the industry such as Global Positioning Subsystem 91, speakers, microphones, USB interfaces, camera 93, microphone 97, Bluetooth transceiver 93, Wi-Fi transceiver 99, image sensors, temperature sensors, health sensors, biometric sensors, etc., the details of which are not shown for brevity and clarity reasons. One feature of the Bluetooth transceiver and the Wi-Fi transceiver 99 is a unique address that is encoded into transmissions that is used to uniquely correlate between the smart device (smartphone 10) and the user.

The cellular network interface 80 connects the smartphone 10 to the cellular network 68 through any cellular band and cellular protocol such as GSM, TDMA, LTE, etc., through a wireless medium 78. There is no limitation on the type of cellular connection used. The cellular network interface 80 provides voice call, data, and messaging services to the smartphone 10 through the cellular network 68.

For local communications, many smartphones 10 include a Bluetooth transceiver 93, a Wi-Fi transceiver 99, or both. Such features of smartphones 10 provide data communications between the smartphones 10 and data access points and/or other computers such as a personal computer (not shown). In the system for sensing a user, the Bluetooth transceiver 93 and a Wi-Fi transceiver 99, or both, are used to identify which users are within the area 100 and to identify where each user is located within the area 100.

Figure 3:
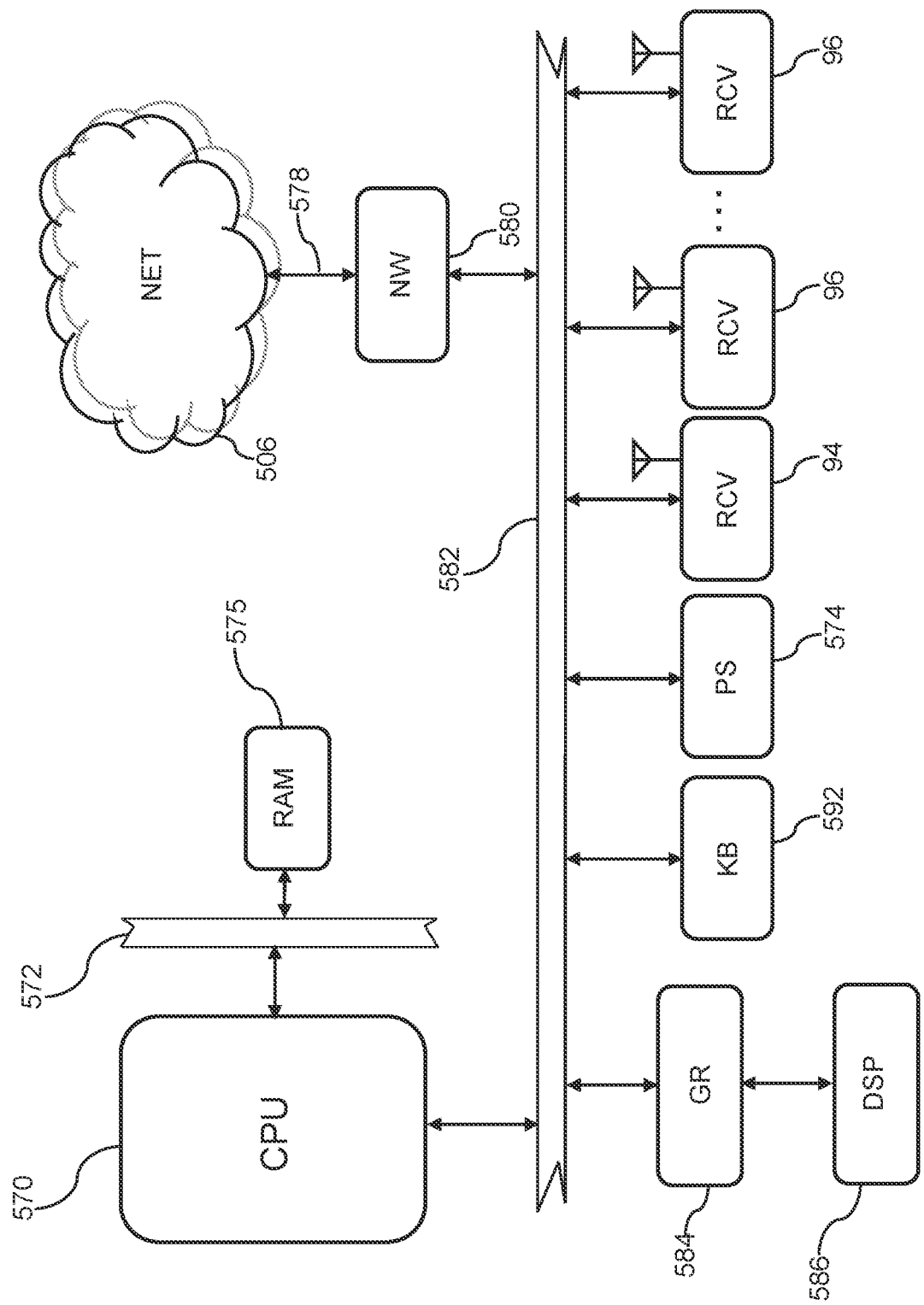
FIG. 3 illustrates a schematic view of a typical computer system such as a server or personal computer.

Referring to FIG. 3, a schematic view of a typical computer system (e.g. server computer 500) is shown. The example computer system (e.g. server computer 500) represents a typical computer system used in the system for sensing a user for calculating which users are present, a location of each user, and for properly setting each device 510/512/514 through the control circuit 95. This exemplary computer system is shown in its simplest form. Different architectures are known that accomplish similar results in a similar fashion and the present invention is not limited in any way to any particular computer system architecture or implementation.

Although represented as a computer system 500 having a single processor 570, it is fully anticipated that other architectures be used to obtain the same or similar results. For example, it is fully anticipated that each device 510/512/514 have integral processing capabilities and each device 510/512/514 communicates directly with each other to jointly control without the use of a computer system 500.

In the example computer system 500 of FIG. 3, a processor 570 executes or runs programs in a random-access memory 575. The programs are generally stored within a persistent memory 574 and loaded into the random-access memory 575 when needed. The processor 570 is any processor, typically a processor designed for computer systems with any number of core processing elements, etc. The random-access memory 575 is connected to the processor by, for example, a memory bus 572. The random-access memory 575 is any memory suitable for connection and operation with the selected processor 570, such as SRAM, DRAM, SDRAM, RDRAM, DDR, DDR-2, etc. The persistent memory 574 is any type, configuration, capacity of memory suitable for persistently storing data, for example, magnetic storage, flash memory, read only memory, battery-backed memory, magnetic memory, etc. The persistent memory 574 (e.g., disk storage) is typically interfaced to the processor 570 through a system bus 582, or any other interface as known in the industry.

Also shown connected to the processor 570 through the system bus 582 is a network interface 580 (e.g., for connecting to a data network 506), a graphics adapter 584 and a keyboard interface 592 (e.g., Universal Serial Bus—USB). The graphics adapter 584 receives commands from the processor 570 and controls what is depicted on a display 586. The keyboard interface 592 provides navigation, data entry, and selection features.

In general, some portion of the persistent memory 574 is used to store programs, executable code, data, and other data, etc.

The peripherals are examples and other devices are known in the industry such as pointing devices, touch-screen interfaces, speakers, microphones, USB interfaces, radio frequency receivers 94/96/98, Wi-Fi transceivers, image sensors, temperature sensors, etc., the details of which are not shown for brevity and clarity reasons. Although three radio frequency receivers 94/96/98 are shown, there is no limitation as to the number of radio frequency receivers 94/96/98.

Figure 4:
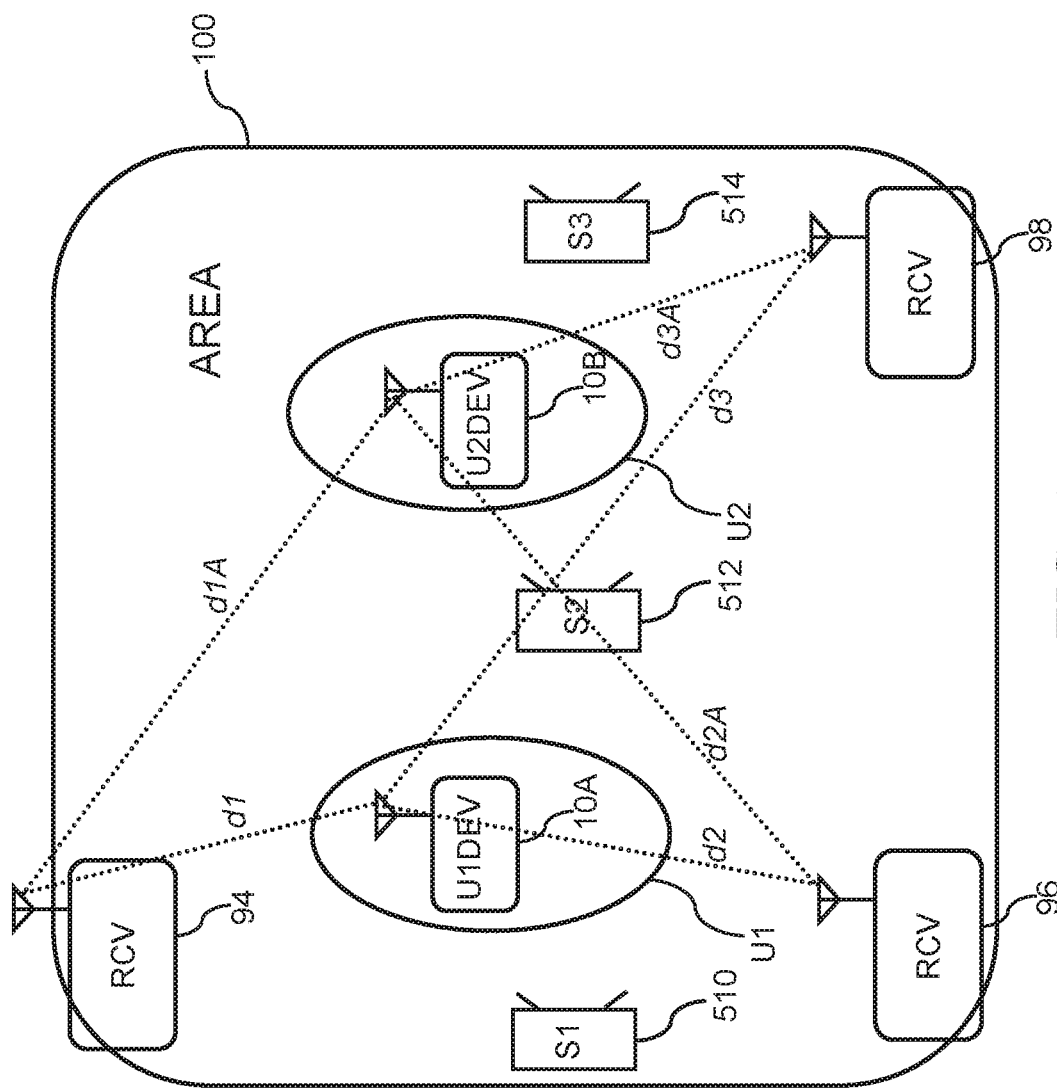
FIG. 4 illustrates plan view of an area covered by the system for sensing users utilizing radio triangulation.

Referring to FIG. 4, a plan view of an area 100 covered by the system for sensing users utilizing radio triangulation is shown. In this example, the devices 510/512/514 are speakers (S1, S2, S3) and there are two smart devices (smartphones 10A/10B) within the area 100. Also, in this example are three radio frequency receivers 94/96/98 covering the area 100.

As each smartphone 10A/10B emits a radio frequency signal, the radio frequency signal is received at some time by each of the three radio frequency receivers 94/96/98. The time that the radio frequency signal is received from the first smartphone 10A is dependent upon a distance (d1, d2, d3) between the first smartphone 10A and each of the three radio frequency receivers 94/96/98. Likewise, time that the radio frequency signal is received from the second smartphone 10B is dependent upon a distance (d1A, d2A, d3A) between the second smartphone 10B and each of the three radio frequency receivers 94/96/98. For example, when the first smartphone 10A emits a radio signal, the first radio frequency receiver 94 receives that radio signal at time t1 which is dependent upon distance d1; the second radio frequency receiver 96 receives that radio signal at time t2 which is dependent upon distance d2; and the third radio frequency receiver 98 receives that radio signal at time t3 which is dependent upon distance d3. Since d1 is shorter than d2, t1 is earlier than t2, etc. Through triangulation algorithms, the exact locations of the first smartphone 10A and the second smartphone 10B are calculated. Through analysis of the radio signal emitted from each smartphone 10A/10B, the identity of each user is determined and, a profile of each user is either obtained directly from the smartphones 10A/10B of retrieved from the user data area 502 using an identity of each smartphone 10A/10B that is encoded in the radio signals.

Having the locations of each smartphone 10A/10B (and hence each user U1 and U2), the system for sensing users controls various devices that are in proximity to each user. For simplicity purposes, in this example, speakers S1, S2, and S3 are controlled, though it is anticipated that any devices 510/512/514 are controlled.

The server computer 500 determines that the first smartphone 10A (and user U1) is located between the speaker S1 and the speaker S2 (e.g. based upon known locations for the speakers S1/S2). For now, assume the second user U2 is not present. Absent of the second user U2, the server controls the speaker S1 and the speaker S2 based upon audio preferences of the first user U1. For example, if the preferences of the first user, U1, indicate preferences for high volume, high bass, and low treble, the server controls the speaker S1 and the speaker S2 for high volume, high bass, and low treble. S3 being distant (known location) from the first user U1 is, for example, muted. As the first user U1 traverses the area 100 and moves between the second speaker S2 and the third speaker S3, the first speaker S1 is muted by the server and the server controls the speaker S2 and the speaker S3 for high volume, high bass, and low treble.

In some embodiments, even though there is only the first user U1, there are default values such as a predetermined base set of preferences and as the first user U1 moves within the location, the preferences of the first user U1 are merged with the predetermined base set of preferences based upon distances from the various devices (e.g. first speaker S1, second speaker S2, third speaker S3). In some such embodiments, the predetermined base set of preferences are anticipated to be configured so as to be virtually a certain distance from the various devices (e.g. first speaker S1, second speaker S2, third speaker S3) so that as the first user U1 is at the same distance for one of the devices as this certain distance, then the predetermined base set of preferences has the same footing as the first user's preferences (assuming equal priority between the predetermined base set of preferences and the first user's preferences.

Now, assume the second user U2 is present. In the presence of the second user, U2, the server controls the speaker S1 based upon audio preferences of the first user U1, the speaker S3 based upon the audio preferences of the second user U2, and the speaker S2 based upon a merger of preferences of the first user U1 and the second user U2. For example, if the preferences of the first user, U1, indicate preferences for high volume, high bass, and low treble, and if the preferences of the second user, U2, indicate preferences for low volume, high bass, and high treble; the server controls the speaker S1 for high volume, high bass, and low treble; and the speaker S3 for low volume, high bass, and high treble. Since the speaker S2 is heard by both the first user U1 and the second user U2, the server controls the speaker S2 for medium volume (average between high volume from the first user's profile and low volume from the second user's profile), high bass (both user's profiles indicate high base), and medium treble (average between low treble from the first user's profile and high treble from the second user's profile).

As the first user U1 and the second user U2 move within the area 100, the location of each user is constantly monitored and the audio from each speaker S1/S2/S3 is adjusted based upon each user's distance from each speaker S1/S2/S3 with respect to other user's distance from each speaker S1/S2/S3.

Figure 5:
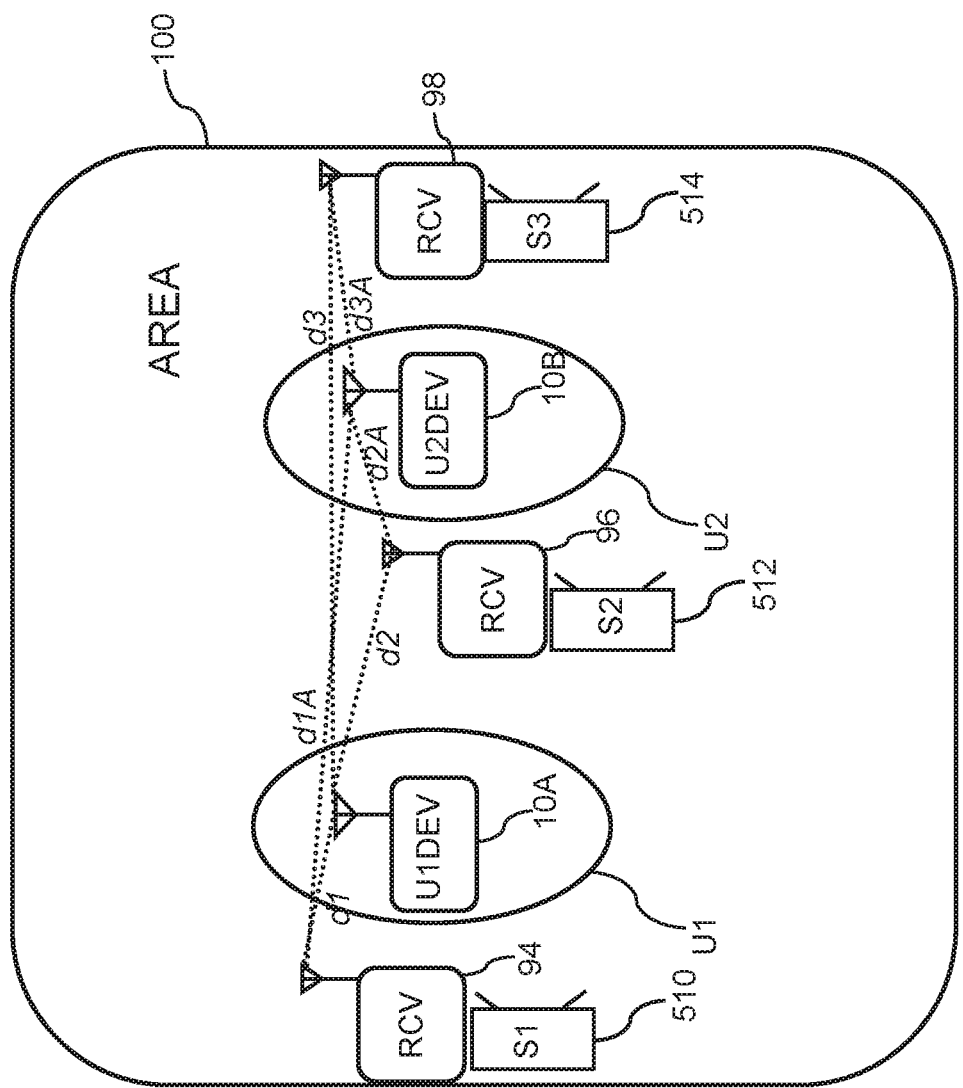
FIG. 5 illustrates plan view of an area covered by the system for sensing users utilizing radio signal strength.

Referring to FIG. 5, plan view of an area 100 covered by the system for sensing users utilizing radio signal strength is shown. In this example, the devices 510/512/514 are speakers (S1, S2, S3) and there are two smart devices (smartphones 10A/10B) within the area 100. Also, in this example are three radio frequency receivers 94/96/98 covering the area 100, each in proximity to a device 510/512/514 that is to be controlled by the server computer 500.

As each smartphone 10A/10B emits a radio frequency signal, the radio frequency signal is received at some received signal strength by each of the three radio frequency receivers 94/96/98. The signal strength that the radio frequency signal is received from the first smartphone 10A is dependent upon a distance (d1, d2, d3) between the first smartphone 10A and each of the three radio frequency receivers 94/96/98 (e.g. known location of the devices 510/512/514). Likewise, the signal strength that the radio frequency signal is received from the second smartphone 10B is dependent upon a distance (d1A, d2A, d3A) between the second smartphone 10B and each of the three radio frequency receivers 94/96/98. For example, when the first smartphone 10A emits a radio signal, the first radio frequency receiver 94 receives that radio signal at a first received signal strength rss1 which is dependent upon distance d1; the second radio frequency receiver 96 receives that radio signal at a second received signal strength rss2 which is dependent upon distance d2; and the third radio frequency receiver 98 receives that radio signal at a third received signal strength rss3 which is dependent upon distance d3. Since d1 is shorter than d2, the first received signal strength rss1 is greater than the second received signal strength rss2, etc. Through analysis of the signal content of the radio signal received from each smartphone 10A/10B, the identity of each user is determined and, a profile of each user is either obtained directly from the smartphones 10A/10B of retrieved from the user data area 502 using an identity of each smartphone 10A/10B that is encoded in the radio signals.

Having the signal strengths measurements regarding each smartphone 10A/10B (and hence each user U1 and U2) at locations of each device 510/512/514, the system for sensing users controls various devices 510/512/514 that are in proximity to each user. For simplicity purposes, in this example, speakers S1, S2, and S3 are controlled, though it is anticipated that any devices 510/512/514 are controlled.

The server computer 500 determines that the first smartphone 10A (and user U1) is located close to the speaker S1 and the speaker S2. For now, assume the second user U2 is not present. Absent of the second user, U2, the server controls the speaker S1 and the speaker S2 based upon audio preferences of the first user U1. For example, if the preferences of the first user, U1, indicate preferences for high volume, high bass, and low treble, the server controls the speaker S1 and the speaker S2 for high volume, high bass, and low treble. S3 being distant from the first user U1 (lower signal strength) is, for example, muted. As the first user U1 traverses the area 100 and moves between the second speaker S2 and the third speaker S3, the first speaker S1 is muted by the server since the received signal strength reduces at the first radio frequency receiver 94 and the server controls the speaker S2 and the speaker S3 for high volume, high bass, and low treble.

Now, assume the second user U2 is present. Since the received signal strength from the first user U1 at S1 and S2 is higher and the received signal strength from the second user U2 at S2 and S3 is higher, the server controls the speaker S1 based upon audio preferences of the first user U1, the speaker S3 based upon the audio preferences of the second user U2, and the speaker S2 based upon a merger of preferences of the first user U1 and the second user U2. For example, if the preferences of the first user, U1, indicate preferences for high volume, high bass, and low treble, and if the preferences of the second user, U2, indicate preferences for low volume, high bass, and high treble; the server controls the speaker S1 for high volume, high bass, and low treble; and the speaker S3 for low volume, high bass, and high treble. Since the speaker S2 is heard by both the first user U1 and the second user U2, the server controls the speaker S2 for medium volume (average between high volume from the first user's profile and low volume from the second user's profile), high bass (both user's profiles indicate high base), and medium treble (average between low treble from the first user's profile and high treble from the second user's profile).

As the first user U1 and the second user U2 move within the area 100, the location of each user is constantly monitored and the audio from each speaker S1/S2/S3 is adjusted based upon each user's distance from each speaker S1/S2/S3 with respect to other user's distance from each speaker S1/S2/S3.

When only one user is present, the settings of each device 510/512/514 is determined by that user's preferences and that user's distances from each device 510/512/514. In this way, when the user is closest to one device 510, that user will have a greater influence on settings of that device 510 than a second device 512 that is further away.

When multiple users are present the settings of each device 510/512/514 is determined by a merger of each user's preferences and each user's distances from each device 510/512/514. In this way, a user closest to one device 510 will have a greater influence on settings of that device 510 than a different user that is farther away from that device 510.

In some embodiments, influence on each device 510/512/514 is proportional to the user's distance from each device 510/512/514. For example, if a first user U1 has a volume preference of 1 (range 1-10) and a second user U2 has a volume preference of 10 (range 1-10) and both are the same distance from one device 510, then the volume setting of the one device 510 is set to 5 (average), assuming both users U1/U2 have equal priority. For example, if the first user is 4 feet from the one device 510 and the second user is 8 feet from the one device 510, then the volume setting of the one device 510 is set closer to the first user U1 who is closer. For example, the volume setting is set to the weighted average of the user preferences such as 2× the volume preference of the first user U1 plus 1× the volume preference of the second user U2 divided by 3 ((2×10)+(1×1)/3), or in this example, a volume setting of 7 (closer to the profile setting of the first user U1 since the first user U1 is closer to the one device 510). Now, if the first user moves and is now 8 feet from the one device 510 and the second user moves and is now 4 feet from the one device 510, the volume setting of the one device 510 is set closer to the first user U1 who is closer. The volume setting is set to the weighted average of the user preferences such as 2× the volume preference of the second user U2 plus 1× the volume preference of the first user U1 divided by 3 ((2×1)+(1×10)/3), or in this example, a volume setting of 4 (closer to the profile setting of the second user U2 since the second user U2 is closer to the one device 510).

Note that, as explained later, in some embodiments, users U1/U2 have the ability to gain priority through various loyalty or payment mechanisms. In such, depending upon the level of priority, it is anticipated that if the first user U1 has a higher priority than the second user U2, then the settings will be skewed toward the preferences of the first user U1, depending upon differences between the priority of the first user U1 in contrast to the priority of the second user U2.

In some embodiments, each user also has a priority based upon a value derived from, for example, paying for priority or earning points each time the user patronizes the area 100. For example, a frequent dancer one a specific dance floor (area 100) will have more points than someone who visits the dance floor once every year and, therefore, frequent dancer's profile settings will have more weight than the profile settings of the person that visits once every year. In this, even if both are the same distance from a device 510/512/514, the frequent dancer's profile settings will have more weight than the profile settings of the person that visits once every year.

In some embodiments, volume settings of each device 510/512/514 that is a speaker is determined from volume profile settings of all users in range of the device 510/512/514. In some embodiments, audio equalization settings of each device 510/512/514 that is a speaker is determined from audio equalization profile settings of all users in range of the device 510/512/514. In some embodiments, audio balance settings of each device 510/512/514 that is a speaker is determined from pure locations of all users in range of the device 510/512/514. In some embodiments, color and/or brightness settings of each device 510/512/514 that is an emitter of light is determined from color and/or brightness profile settings of all users in range of the device 510/512/514.

In some embodiments, light pulse rate and/or color intensity of each device 510/512/514 that is an emitter of light is determined from pulse rate profile settings of all users in range of the device 510/512/514. In some embodiments, light pulse rate of each device 510/512/514 that is an emitter of light is determined from measured heart beat patterns of all users in range of the device 510/512/514. In such, for example, as the collective heart rates of all users in range of the device 510/512/514 increases, so does the light pulse rate and/or color intensity of each device 510/512/514 that is an emitter of light. In this embodiment, it is anticipated that the radio frequency signal is timed with user's pulse or the user's pulse rate is encoded into the radio frequency signal.

In some embodiments, audio balance settings of each device 510/512/514 that is a speaker is determined from pure locations of all users in range of the device 510/512/514. This is anticipated to be of use in a multiple speaker audio system. In the past, if a listener is not sitting centered between the speakers of such an audio system, the balance needed to be adjusted manually (e.g. if the listener is closest to the left speaker, the right speaker volume needed to be increased). In the disclosed system, as the user positions themselves anywhere in range of the speakers, the balance is automatically adjusted to provide best balance given the location of the user. When two or more users are in range of the speakers, then compromises are made to provide the best listening experience to both users.

Figure 6:
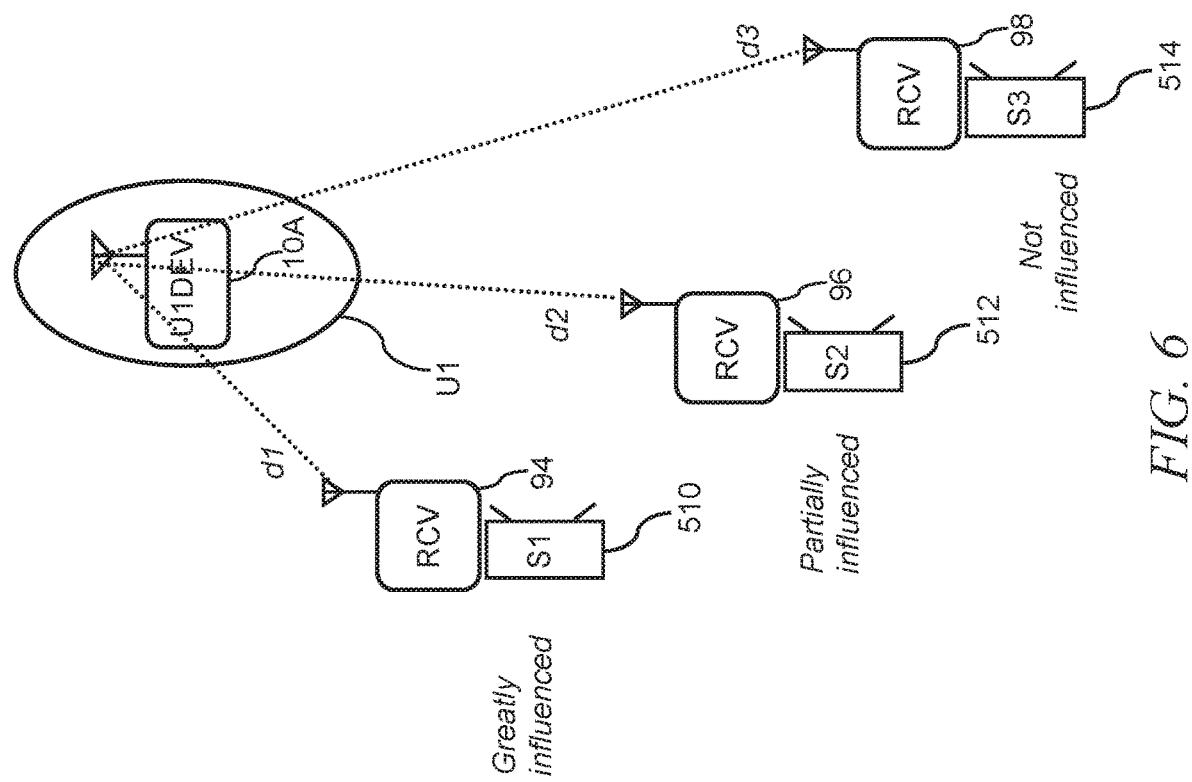
FIG. 6 illustrates an exemplary user interfaces showing a user's profile.

Referring to FIG. 6, a schematic view of an area 100 covered by the system for sensing users utilizing radio signal strength is shown. In this example, the devices 510/512/514 are speakers (S1, S2, S3) and there is one smart devices (first smartphones 10A) within the area 100. Also, in this example are three radio frequency receivers 94/96/98 covering the area 100, each in proximity to a device 510/512/514 that is to be controlled by the server computer 500 (or distributed control by a distributed processing scheme).

The first smartphone 10A emits a radio frequency signal, the radio frequency signal is received at some received signal strength by each of the three radio frequency receivers 94/96/98. The signal strength that the radio frequency signal is received from the first smartphone 10A is dependent upon a distance (d1, d2, d3) between the first smartphone 10A and each of the three radio frequency receivers 94/96/98. For example, when the first smartphone 10A emits a radio signal, the first radio frequency receiver 94 receives that radio signal at a first received signal strength rss1 which is dependent upon distance d1; the second radio frequency receiver 96 receives that radio signal at a second received signal strength rss2 which is dependent upon distance d2; and the third radio frequency receiver 98 receives that radio signal at a third received signal strength rss3 which is dependent upon distance d3. Since d1 is shorter than d2, the first received signal strength rss1 is greater than the second received signal strength rss2, etc. Through analysis of the signal content of the radio signal received from the first smartphone 10A, the identity of the user U1 is determined and, a profile of the user is either obtained directly from the first smartphones 10A or retrieved from the user data area 502 using an identity of the first smartphone 10A that is encoded in the radio signals.

In this example, the first smartphone 10A is close to S1 and, therefore, S1 is greatly influenced by the profile settings of the user U1, but the first smartphone 10A is not as close to S2 and, therefore, S2 is only partially influenced by the profile settings of U1. The first smartphone 10A is too far from S3 and, therefore, S3 is not influenced by the profile settings of user U1

Figure 7:
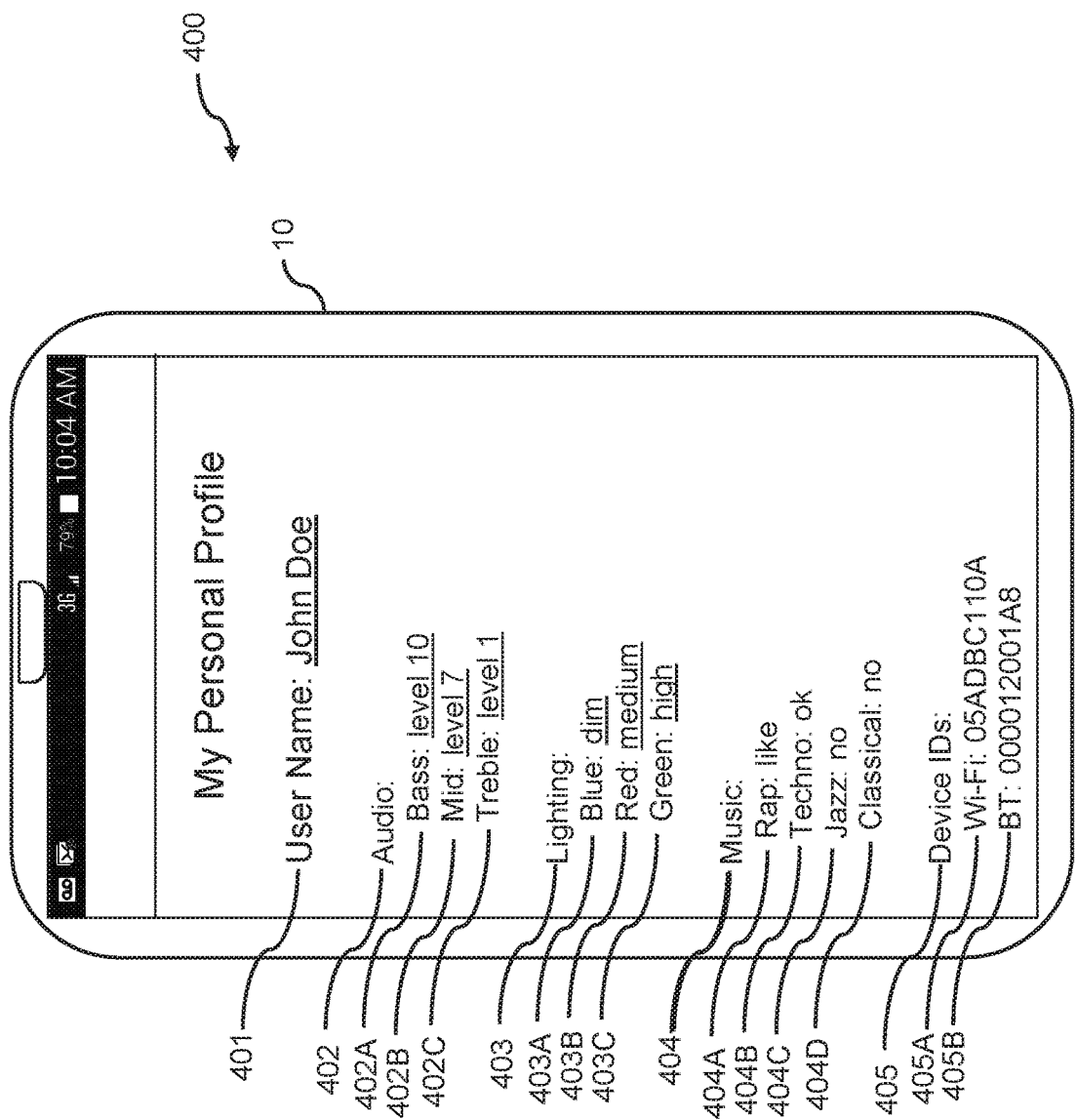
FIG. 7 illustrates an exemplary user interface for displaying/changing a user's preferences.

Referring to FIG. 7, an exemplary user interface for displaying/changing a user's preferences is shown. In general, each device, and therefore, each user has a personal profile 400 indicating user preferences. In this example, the user has a user name 401 (e.g., "John Doe." This user has several preferences including audio preferences 402 of base 402A at a level 10 (e.g. high), midrange 402B at a level 7, and treble 402C at a level 1 (low). This user has preferences for lighting 403 with blues 403A at dim levels, reds 403B at medium levels, and greens 403C at high levels. As far as music genre, this user's preferences are that they like rap 404A, are okay with techno 404B, and the do not like jazz 404C or classical 404D music. This user device (user device 10/11 possessed by this user) had several device identifiers 405, a Wi-Fi device serial number (e.g. MAC address) 405A of "05ADBC110A" and a Bluetooth device serial number (e.g. MAC address) 405B of "000012001A8." The device identifiers 405 are used by the receivers and/or the server computer 500 to determine the user associated with a device that is within range of the area 100.

Referring to FIGS. 8-11, exemplary program flows of the exemplary system for sensing a user are shown. The program flows are shown for examples as it is well known to perform software tasks in many different ways achieving the same or similar outcomes.

It is anticipated that portions of the exemplary program flow execute on a user device such as a smartphone 10 while portions of the exemplary program flow execute on the server computer 500.

Figure 8:
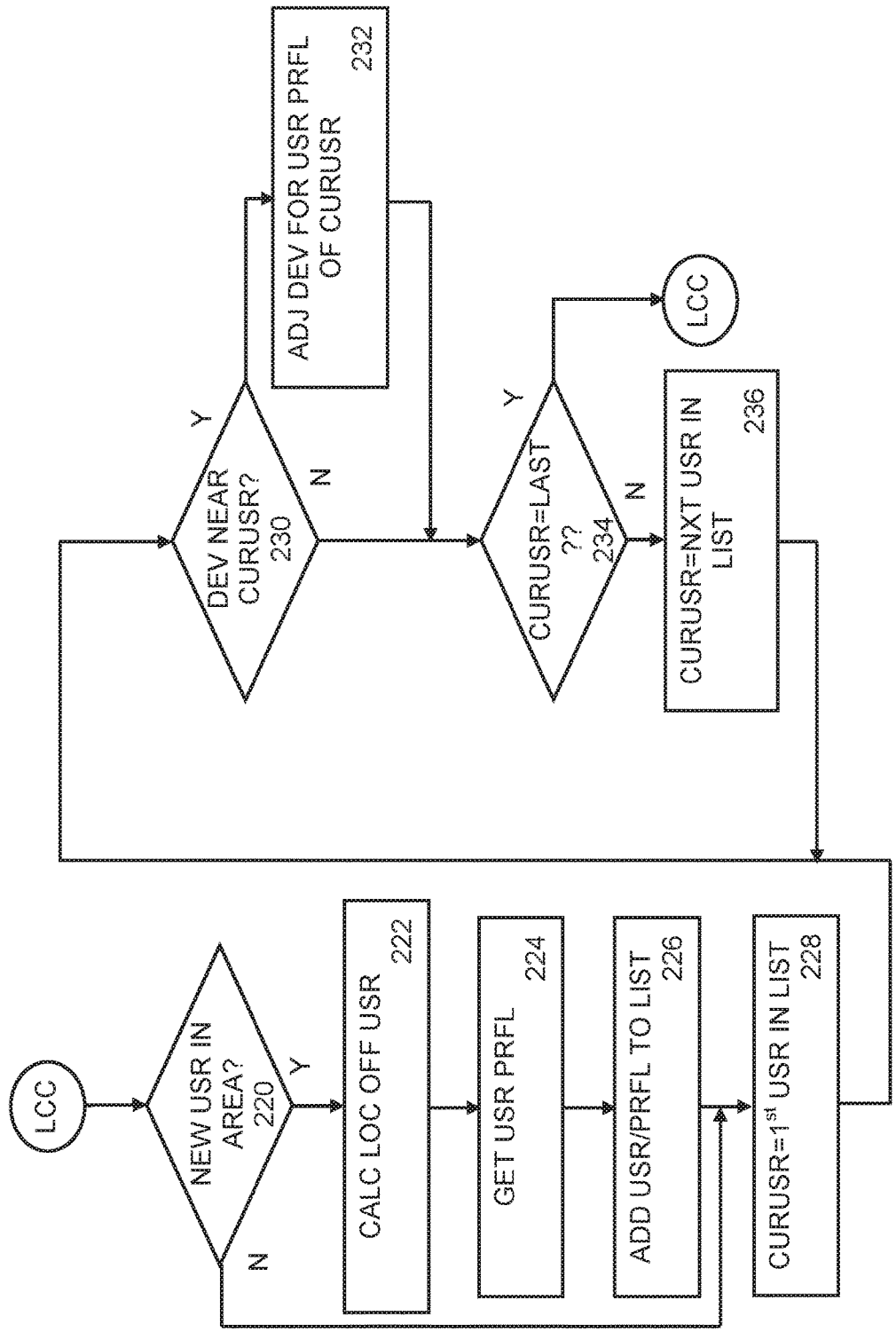
FIG. 8 illustrates an exemplary program flow for sensing users and adjusting devices.

In this example, starting with FIG. 8, the flow loops while the exemplary system for sensing a user is determining whether a user is in the area 100. The loop starts with a test 220 to determine if a user is in the area 100. The determination is done as described, by measuring the signal strength of a radio signal from a device possessed by a user or triangulating the location of the user by received timing from a radio signal transmitted from the device possessed by the user as received in several (typically three) locations. In some embodiments, presence of the user (and identity of the user) is performed using cameras (e.g. identity is determined by facial recognition, other biometric input, or user input mechanism).

The location of this user is calculated 222 (e.g. location within the area 100) and, a user profile is obtained 224 either by looking up a profile based upon identifying information of the user transmitted in the radio signal or by receiving the profile directly from the user's device within the radio signal. This user's profile is then added 226 to a list of users present in the area 100.

The current user is set to the first user 228 and a second loop is started. The loop determines 230 if the current user is near a device 510/512/514 (e.g. speaker, light emitting device) and if the current user is near a device 510/512/514, the device 510/512/514 is adjusted 332 based upon the profile of the current user. If the current user is the last user in the list 234, then the program flow restarts at the beginning (LCC). If the current user is not the last user in the list 234, then the current user is set to the next user in the list 236 and the loop continues.

Figure 9:
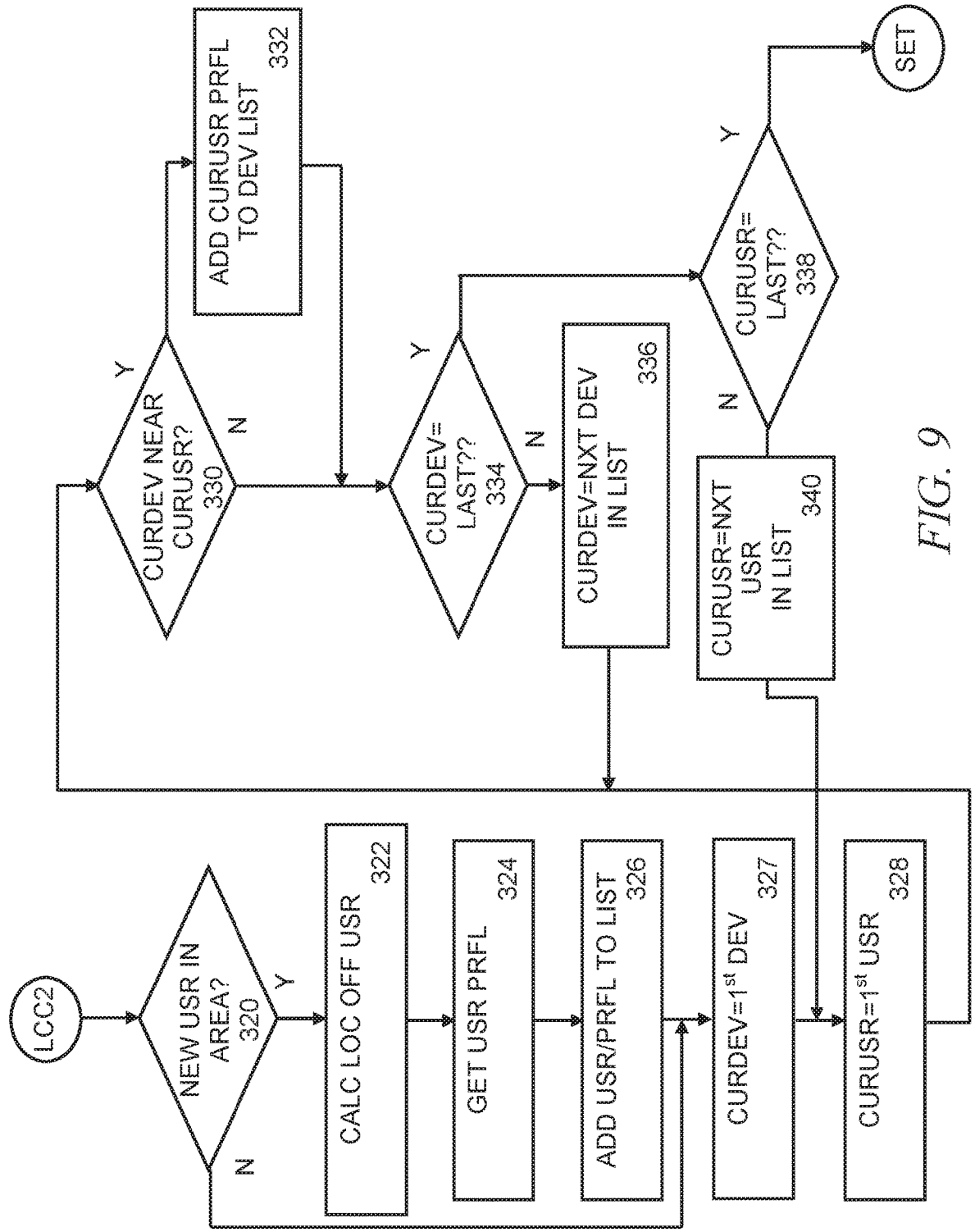
FIG. 9 illustrates a second exemplary program flow for sensing users and adjusting devices.

In FIG. 9, a slightly different method is described in which the device 510/512/514 is set depending on preferences from multiple users in the vicinity of the device 510/512/514. The flow loops while the exemplary system for sensing a user is determining whether a user is in the area 100. The loop starts with a test 320 to determine if a user is in the area 100. The determination is done as described, by measuring the signal strength of a radio signal from a device possessed by a user or triangulating the location of the user by received timing from a radio signal transmitted from the device possessed by the user as received in several (typically three) locations. In some embodiments, presence of the user (and identity of the user) is performed using cameras (e.g. identity is determined by facial recognition, other biometric input, or user input mechanism).

The location of this user is calculated 322 (e.g. location within the area 100) and, a user profile is obtained 324 either by looking up a profile based upon identifying information of the user transmitted in the radio signal or by receiving the profile directly from the user's device within the radio signal. This user's profile is then added 326 to a list of users present in the area 100.

In another loop, the current device is set to the first device 327 and the current user is set to the first user 328 and a second loop is started. If the current user is near 330 a device 510/512/514 (e.g. speaker, light emitting device) the profile of the current user is added to a list for the current device.

If the current device is not the last device in the list of devices 334, then the current device is set 336 to the next device in the list of devices.

If the current device is the last device in the list of devices 334, then if the if the current user is not the last user in the area 338, the current user is set to the next user in the list 340 and program flow proceeds within the loop.

Figure 10:
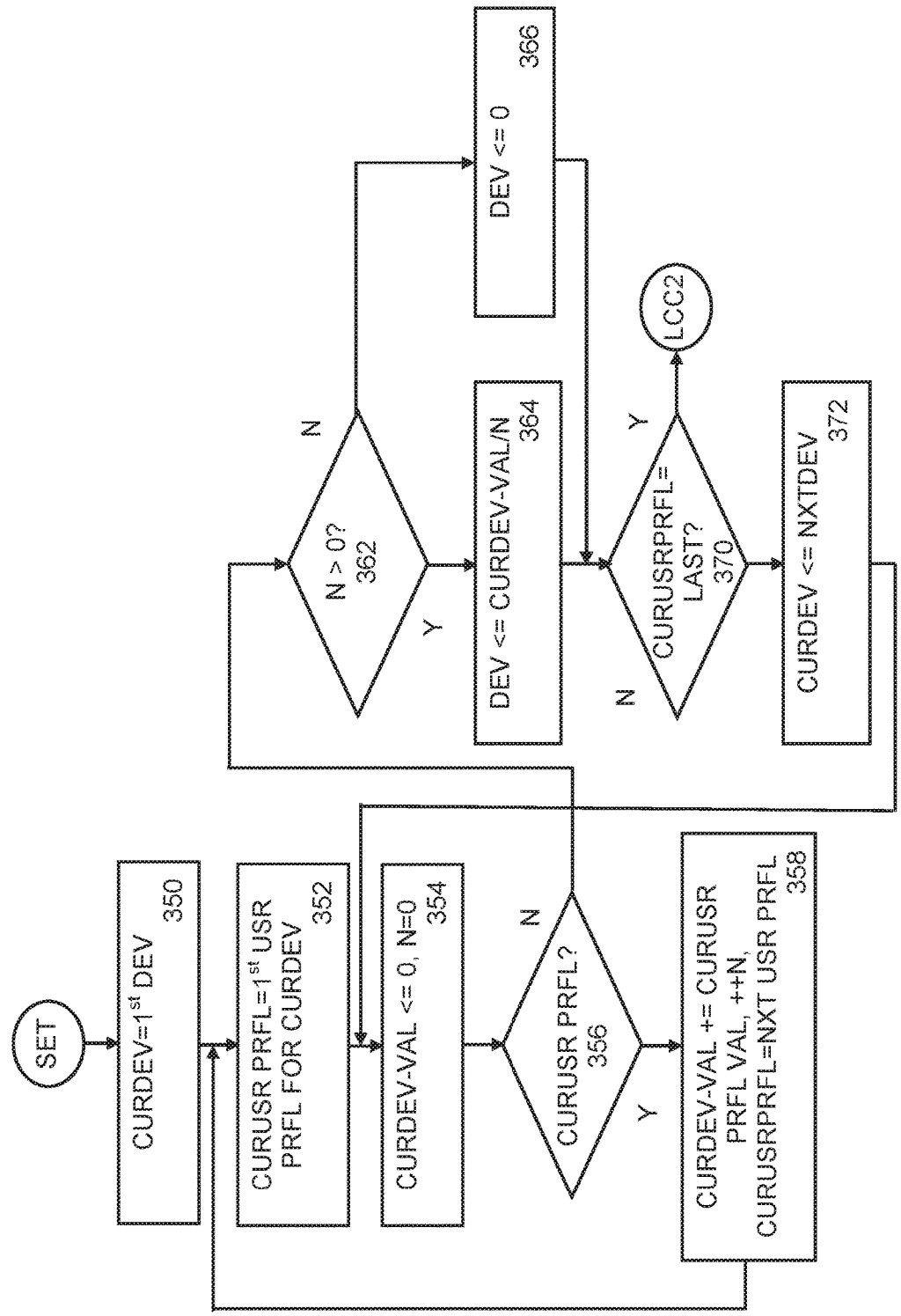
FIG. 10 illustrates an exemplary program flow for sensing users and adjusting devices.
Figure 11:
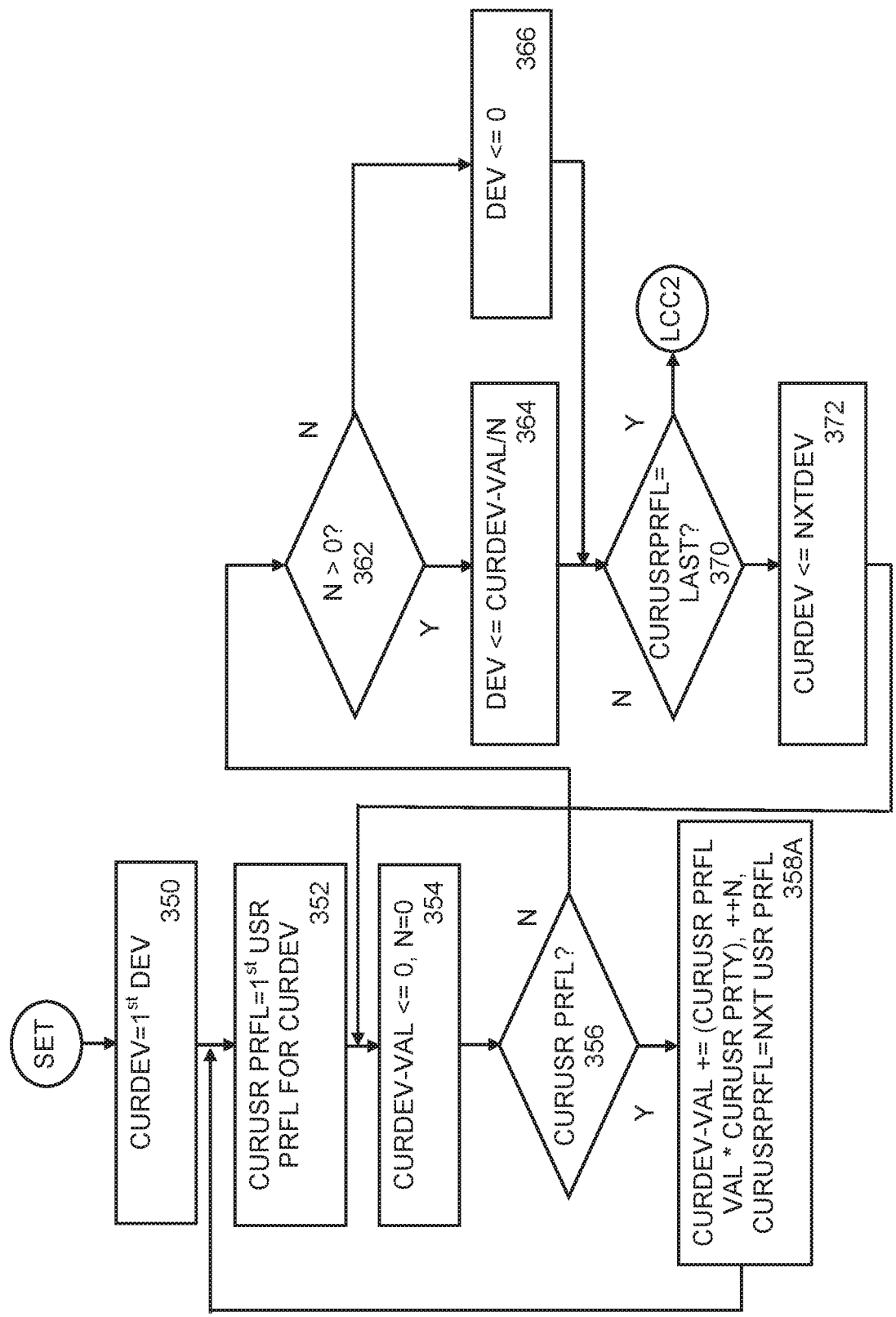
FIG. 11 illustrates an exemplary program flow for sensing users and adjusting devices.

If the current device is the last device in the list of devices 334, then if the if the current user is the last user in the area 338, the program flow proceeds to set the devices according to the profiles in the lists (see FIGS. 10 and 11).

In FIGS. 10 and 11, two program flows are shown for setting each device 510/512/514 to the appropriate settings based upon the profiles of the users that are in range of those devices. The current device is set to the first device 350 and a loop begins (for each device in the list of devices). First, the current user profile is set to the first user profile that was stored for the current device 352. Now an inner loop begins setting 354 the current device value to zero and a counter to zero. A test is performed 356 to determine if there is a current user profile stored for this device. If there is another current user profile stored for this device, then the current user profile value is added to the current device value, the count, n, is incremented, and the current user profile is set to the next user profile in the list for this device 358, then the loop continues.

If there is not another current user profile stored for this device, then if the count is zero 362, then the device is either shut off 366 or set to a predetermined setting, for example, controlled by a default profile. If there is not another current user profile stored for this device, then if the count is not zero 362, then the device is set based upon the current device value divided by the count, n (e.g. the average of all profile values for those within range of this device).

Now if the current user profile is the last 370, flow resumes searching for users entering/exiting the area 100 (see FIG. 9).

In FIG. 11, there is a slight modification to one set of steps. In this, the settings for the device are biased based upon a priority of each user.

If there is another current user profile stored for this device, then the current user profile value modified by a current user priority is added to the current device value, the count, n, is incremented, and the current user profile is set to the next user profile in the list for this device 358A, then the loop continues. The current user priority is, for example, a priority achieved by the frequency of visiting the area 100, by paying for extra priority, etc. For example, a first user who rarely visits the area 100 has a priority of 1 while a second user who frequently visits the area 100 has a priority of 1.5 meaning, when these two user's profile settings are averaged, the first user's profile settings have less weight as to settings of the devices that are in range of the first user and second user.

Equivalent elements can be substituted for the ones set forth above such that they perform in substantially the same manner in substantially the same way for achieving substantially the same result. It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method for sensing users, each user having a smart device, the method comprising:

each of the smart devices emitting a radio frequency signal within an area;

obtaining a profile for each of the smart devices within the area;

each of one or more devices:

receiving the radio frequency signal from each of the smart devices by a radio frequency receiver, determining a distance between each of the one or more devices and each of the smart devices using signal strength and/or signal timing of the radio frequency signal from each of the smart devices, obtaining a profile value for each of the one or more devices from the profile for each of the smart devices and generating a value for the each of the smart devices by multiplying the profile value of each of the smart devices with a reciprocal of the distance between each of the one or more devices and each of the smart devices;

generating an average of the values; and setting an output of each of the one or more devices to the average.

2. The method of claim 1, whereas the step of determining the distance between each of the one or more devices and each of the smart devices includes measuring a received signal strength of the radio frequency signal sent from each of the smart devices at a proximal location to each of the one or more devices.

3. The method of claim 2, wherein each of the smart devices is selected from a group consisting of a smartphone, a smartwatch, and a personal fitness device.

4. The method of claim 1, whereas the step of determining the distance between each of the one or more devices and each of the smart devices includes triangulating of the radio frequency signal sent from each of the smart devices and calculating the distance from a known location of each of the one or more devices.

5. The method of claim 4, wherein each of the smart devices is selected from a group consisting of a smartphone, a smartwatch, and a personal fitness device.

6. The method of claim 1, further includes biasing the output for each of the one or more devices based upon a priority of the smart devices.

7. A method for sensing a first user having a first smart device and a second user having a second smart device, each of the first and second smart device emitting a radio frequency signal, the method comprising:

determining a first location of the first smart device within an area using signal strength and/or signal timing of the radio frequency signal from the first smart device;

obtaining a first profile for the first user, the first profile having a first value related to a device;

calculating a distance between the device and the first location;

calculating a parameter for the device based upon the first value related to the device multiplied by a reciprocal of the distance between the device and the first location;

setting an output of the device to the parameter for the device;

determining a second location of the second smart device within the area using signal strength and/or signal timing of the radio frequency signal from the second smart device;

obtaining a second profile for the second user, the second profile having a second value related to the device;

calculating a second distance between the device and the second smart device;

recalculating the parameter for the device based upon an average between the first value related to the device multiplied by the reciprocal of the distance between the device and the first location, and the second value related to the device multiplied by the reciprocal of the second distance between the device and the second location; and setting the output of the device to the recalculated parameter for the device.

8. The method of claim 7, whereas the step of setting the output of the device includes controlling an audio output of the device.

9. The method of claim 7, whereas the step of setting the output of the device includes controlling a brightness and/or color output of the device.

\* \* \* \* \*